N. P. BASSETT.

Bee Hive.

No. 80,587.

Patented Aug. 4, 1868.

Witnesses:

Inventor:

United States Patent Office.

ZEBIAH W. BASSETT, OF FULTON, NEW YORK, ADMINISTRATRIX OF THE ESTATE OF N. P. BASSETT, DECEASED.

*Letters Patent No. 80,587, dated August 4, 1868.*

IMPROVEMENT IN BEE-HIVE.

*The Schedule referred to in these Letters Patent and making part of the same.*

TO ALL WHOM IT MAY CONCERN:

Be it known that N. P. BASSETT, deceased, formerly of Fulton, in the county of Oswego, and State of New York, did, during his lifetime, invent a new and improved Bee-Hive; and I, Mrs. ZEBIAH W. BASSETT, administratrix of the estate of the said N. P. BASSETT, deceased, do hereby declare that the following is a full, clear, and exact description thereof, which will enable others skilled in the art to make and use the same, reference being had to the accompanying drawings, forming part of this specification.

This invention relates to a new and improved bee-hive, and it consists in a new and improved construction of the same, as hereinafter fully shown and described, whereby the ravages of the bee-moth are guarded against by preventing the advent of the miller into the hive.

The invention also consists in a novel construction of the comb-frames, and mode of securing them in the box, whereby the building of vertical combs is insured, and the uniting of the several combs by the bees avoided.

The invention further consists in a novel construction and arrangement of the outer case of the hive, whereby the inner box may be rendered very accessible, and removed from and adjusted within the outer or external case without any difficulty whatever.

In the accompanying sheet of drawings—

Figure 1:
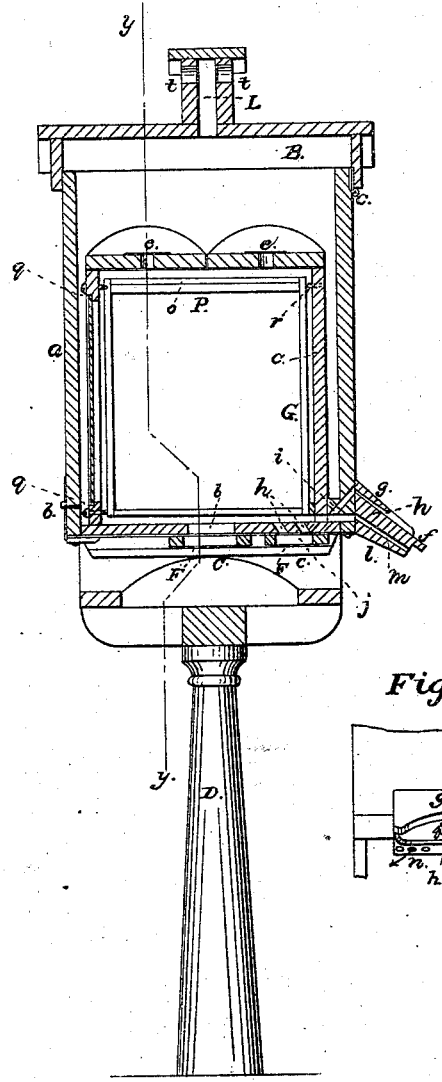
Figure 2:
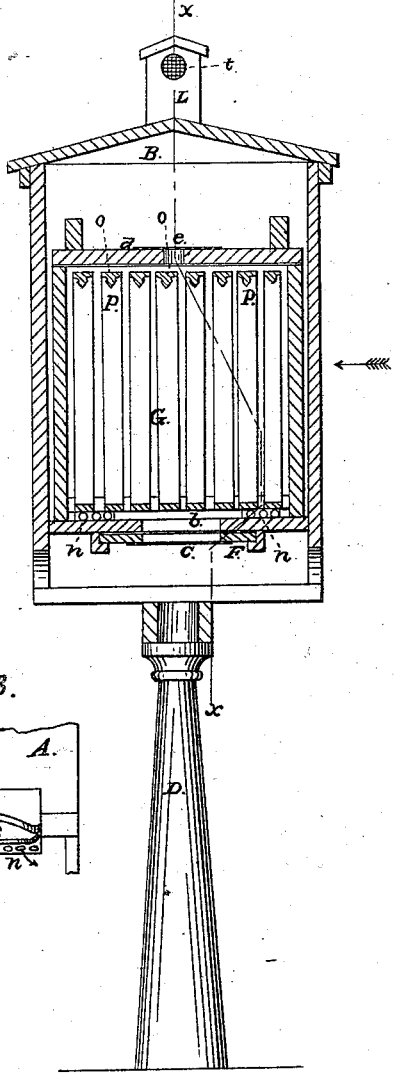

Figure 1 is a vertical section of the invention, taken in the line $x\ x$, fig. 2.

Figure 2, a vertical section of the same, taken in the line $y\ y$, fig. 1.

Figure 3:
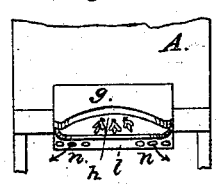

Figure 3 is a fragmentary elevation of a portion of the front of the hive, showing the alighting-board $f$, the entrance-passage $h$, (the concealed portion $i$ thereof being indicated by dotted lines,) and the exit-holes $n\ n$.

Similar letters of reference indicate corresponding parts.

A represents the external case of the hive, which is of quadrilateral form, and has its back or rear side $a$ hinged at its lower end, as shown at $b$, the top B of the hive being hinged to the front part thereof, as shown at $c$.

By this arrangement, when the top, B, is raised, the back, $a$, may be lowered, and the inner box C removed, without any difficulty whatever.

The case A is secured to the top of an upright post, D, which is sunk into the earth or attached to a proper base. The bottom of this case A is perforated with a hole, $b$; underneath which there are slides F F', perforated, and having their perforations covered with wire cloth $c$, as shown in both figures.

The inner box C rests upon the bottom of the external case A, the box C being open at its bottom and top, the box having boards $d\ d$ placed upon it, which are perforated, the perforations being covered with wire cloth $e$, which may be removed, in order to give the bees access to spare-honey boxes, when required. This feature is common, and does not require a specific description or explanation.

At the lower part of the front side of the hive there is attached an alighting-board, $f$, a greater portion of which is covered by a board, $g$, a passage, $h$, being allowed between, which passage communicates with a passage, $i$, leading down into a compartment, $j$, formed by the slide F', said compartment communicating with the inner box C by passages $k$, made in the bottom of case A, as shown clearly in fig. 1.

Below the alighting-board $f$ there is a board, $l$, and between the boards $f$ and $l$ there is a space, $m$, which communicates with holes $n$, leading into the case A. These holes $n$ form exit-passages for the bees, as they will naturally pass out from the inner box C by the most direct route. In entering the hive, they will invariably, however, light on the alighting-board $f$, and pass up the space $h$, and down the passage $i$, into compartment $j$, and up the passage $k$, into the inner box C. This indirect or sinuous route effectually prevents the advent of the miller into the hive.

G represents the comb-frames in the box C. These frames are of rectangular form, and their top pieces $o$ are formed at their under sides with a narrow longitudinal head, $p$, to which the bees commence building their comb. This narrow head insures the combs being built in vertical planes, and the comb of one frame is not liable to be brought in contact with those of the adjoining frames. The several frames are secured in position at a suitable distance apart by means of screws $q$, which pass through one side of the box C, and bear against one side of the comb-frames, and press the upper parts of the opposite sides against spurs $r$ in the opposite side of the box C. By this arrangement the comb-frames are held permanently in position, without the possibility of becoming casually detached or loose in box C.

The perforated slides F F', covered with wire gauze to exclude the passage of the bees, moths, or other insects, being situated at the bottom and central part of the hive, admit air for ventilation, which ascends between the comb-sections, supplying fresh air to the interior and central portions, which passes through the apertures $e\ e$, and finally escapes through the central turret L, which is provided with two or more passages $t\ t$ on opposite sides, similarly protected with wire cloth. This arrangement of the apertures $t\ t$ on opposite sides of the turret at the same level, in combination with the vertical passage of the interior for the ascent of the air, promotes the ventilation, and secures the supplying of pure air to the hive, on the well-known principle of partial vacuum produced by passing currents, the two horizontal apertures inviting the passage of wind-currents, which usually circulate in a horizontal direction when near the surface of the earth.

Having thus described this invention, I claim as new, and desire to secure by Letters Patent—

1. The securing of the comb-frames G in the box C by means of the screws $q$ and spurs $r$, substantially as shown and described.

2. I further claim the exit-passage $m$, in connection with the entrance-passages $h\ i$, and chamber $j$, all arranged substantially as and for the purpose specified.

The above specification of the invention of N. P. BASSETT, deceased, signed by me, this 14th day of February, 1868.

ZEBIAH W. BASSETT,
*Administratrix of the Estate of N. P. Bassett, deceased.*

Witnesses:
  J. E. BARKER,
  GEO. W. HALEY.